(12) United States Patent
Papies

(10) Patent No.: US 11,293,541 B2
(45) Date of Patent: Apr. 5, 2022

(54) TRANSMISSION AND METHOD FOR PRODUCING SUCH A TRANSMISSION

(71) Applicant: FLENDER GMBH, Bocholt (DE)

(72) Inventor: Jennifer Papies, Bochum (DE)

(73) Assignee: Flender GmbH, Bocholt (DE)

( * ) Notice: Subject to any disclaimer, the term of this patent is extended or adjusted under 35 U.S.C. 154(b) by 76 days.

(21) Appl. No.: 16/576,373

(22) Filed: Sep. 19, 2019

(65) Prior Publication Data

US 2020/0096088 A1 Mar. 26, 2020

(30) Foreign Application Priority Data

Sep. 20, 2018 (EP) ..................................... 18195645

(51) Int. Cl.
| | | |
|---|---|---|
| *F16H 57/04* | (2010.01) | |
| *B32B 7/12* | (2006.01) | |
| *B32B 15/04* | (2006.01) | |
| *F16H 57/032* | (2012.01) | |
| *B32B 15/20* | (2006.01) | |

(52) U.S. Cl.
CPC ........... *F16H 57/0419* (2013.01); *B32B 7/12* (2013.01); *B32B 15/046* (2013.01); *B32B 15/20* (2013.01); *F16H 57/032* (2013.01); *B32B 2266/06* (2013.01)

(58) Field of Classification Search
CPC ..... F16H 57/0419; F16H 57/032; B32B 7/12; B32B 15/046; B32B 15/20
USPC ........................................................ 428/613
See application file for complete search history.

(56) References Cited

U.S. PATENT DOCUMENTS

| | | | | |
|---|---|---|---|---|
| 5,021,494 A | * | 6/1991 | Toya ........................ | C08K 5/54 524/404 |
| 5,904,024 A | * | 5/1999 | Miwa ................... | B29C 44/188 52/309.1 |
| 2005/0133774 A1 | * | 6/2005 | Long ....................... | B66D 1/16 254/365 |
| 2012/0024097 A1 | | 2/2012 | Straub | |

FOREIGN PATENT DOCUMENTS

| | | | |
|---|---|---|---|
| DE | 10034301 A1 | 1/2002 | |
| DE | 102010007413 A1 * | 10/2010 | ............... F16M 1/02 |
| DE | 102010007413 A1 | 10/2010 | |
| EP | 1 993 135 | 11/2008 | |
| EP | 2411703 B1 | 6/2013 | |
| JP | 2008251652 A | 10/2008 | |
| JP | 2009253053 A | 10/2009 | |
| JP | 2010040583 A | 2/2010 | |
| JP | 2011100959 A | 5/2011 | |
| JP | 2012159173 A | 8/2012 | |
| JP | 5790531 | 8/2015 | |
| WO | WO 2008146845 A1 | 12/2008 | |

OTHER PUBLICATIONS

Kaufmann et al., DE 102010007413 A1 machine translation, Oct. 2010, entire machine translation (Year: 2010).*

* cited by examiner

*Primary Examiner* — Humera N. Sheikh
*Assistant Examiner* — Katherine A Christy
(74) *Attorney, Agent, or Firm* — Henry M. Feiereisen LLC

(57) ABSTRACT

A transmission includes a housing made from a metallic material and is provided with a cooling structure in the form of a cooling element made from open-cell metal foam. The cooling element can be secured on the housing, in particular on an outer surface of the housing, by a screw connection and/or adhesive bonding and/or magnetically.

13 Claims, 2 Drawing Sheets

TRANSMISSION AND METHOD FOR PRODUCING SUCH A TRANSMISSION

CROSS-REFERENCES TO RELATED APPLICATIONS

This application claims the priority of European Patent Application, Serial No. 18195645.9, filed Sep. 20, 2018, pursuant to 35 U.S.C. 119(a)-(d), the disclosure of which is incorporated herein by reference in its entirety as if fully set forth herein.

BACKGROUND OF THE INVENTION

The present invention relates to a transmission and to a method for producing such a transmission.

The following discussion of related art is provided to assist the reader in understanding the advantages of the invention, and is not to be construed as an admission that this related art is prior art to this invention.

A crucial factor in the transmission engineering sector involves dissipation of heat, generated in the transmission, from the transmission housing so as to ensure proper operation of the transmission for an extended period. For this purpose, the transmission can be provided with an active cooling device. As an alternative or in addition, a passive cooling system can be provided by increasing a housing surface area through the provision of cooling structures in the form of cooling fins, for example. However, housings with such cooling fins become very expensive when compared with housings without cooling fins. Moreover, the formation of cooling fins is associated with a relatively large increase in the dead weight of the housing, which is undesirable in many cases.

It would therefore be desirable and advantageous to provide an improved transmission which obviates prior art shortcomings and which can be produced in a simple and low-cost manner while still being reliable in operation and enabling flexible adjustment of the cooling capacity to suit any demand.

SUMMARY OF THE INVENTION

According to one aspect of the present invention, a transmission includes a housing made from a metallic material and including a cooling structure, the cooling structure including a cooling element made from open-cell metal foam and secured on the housing.

According to another advantageous feature of the present invention, the cooling element can be secured on an outer surface of the housing.

In the following description, the reference to "a cooling element" should not be limited to the presence of a single cooling element but is used in a generic sense and the principles described in the following description with respect to a cooling element are equally applicable to the presence of any number of such cooling elements.

A significant advantage of providing cooling elements made from open-cell metal foam over conventional cooling fins resides in a significantly larger surface area and improved cooling capacity associated therewith. Moreover, such cooling elements made from open-cell metal foam have a lower dead weight than cooling fins, so that the housing of a transmission according to the invention can be made lighter than a housing with cooling fins while still maintaining a comparable cooling capacity. Another advantage associated with the use of separate cooling elements made from open-cell metal foam is that the cooling elements can be secured later on to suit a demand at hand, for example a housing manufactured by casting. This allows simple and flexible adjustment of the cooling capacity to the demand at hand. In particular, such retrofitting of cooling elements makes it possible to achieve a wide range of cooling capacities on the basis of a standard housing, and this allows low-cost series manufacture when housings of essentially same design with different cooling capacity are required.

According to another advantageous feature of the present invention, the cooling element can be made of aluminum or copper. Using aluminum and copper has the benefits of good thermal conductivity, while at the same time being of low weight.

According to another advantageous feature of the present invention, the cooling element can have a plate-shaped configuration. This allows simple and flexible handling. For example, the shape of the underside can be matched to the shape of a region of the outer surface of the housing. Thus, the cooling element can have an underside in the form of a circular ring segment to enable its simple securement on a housing, the outer surface of which is likewise in the form of a circular ring segment, at least in one region thereof.

According to another advantageous feature of the present invention, an intermediate layer containing silicone and thermally conductive particles can be provided between the cooling element and the housing. This is advantageous especially when the surface of the housing on which the cooling element is to be arranged is uneven, as is often the case when the housing is produced by casting, for example.

According to another advantageous feature of the present invention, the cooling element can be secured on the housing by a screw connection and/or adhesive bonding. This allows very simple mounting of the cooling element on the housing. As an alternative or in addition, the cooling element can be secured on the housing by a magnet.

According to another aspect of the present invention, a method for producing a transmission includes securing on a housing made from a metallic material a cooling element made from open-cell metal foam to provide a cooling structure on the housing.

According to another advantageous feature of the present invention, an intermediate layer containing silicone and thermally conductive particles can be provided between the cooling element and the housing. As a result, irregularities in the housing surface in particular can be compensated.

According to another advantageous feature of the present invention, the cooling element can be secured on the housing by a screw connection and/or adhesive bonding and/or magnetically.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
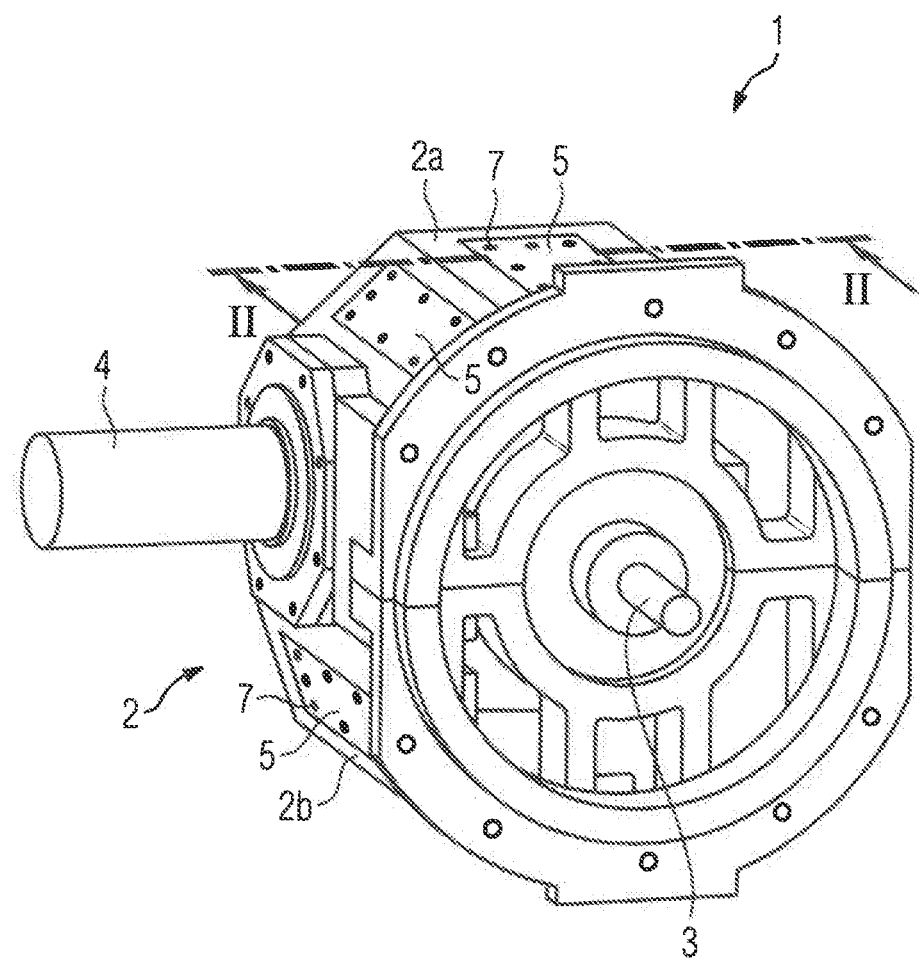
FIG. 1 is a schematic perspective view of a transmission according to present invention, depicting the presence of cooling elements arranged thereon.
Figure 2:
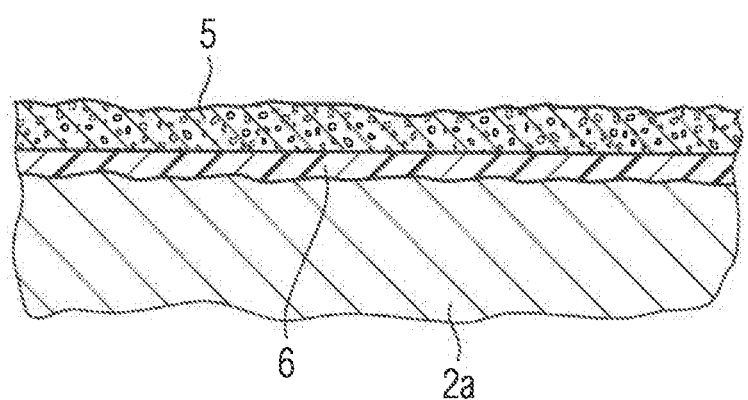
FIG. 2 is an enlarged cross section of the transmission of FIG. 1, taken along a section line II-II in FIG. 1.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic perspective view of a transmission according to present invention, generally designated by reference numeral 1. In the non-limiting example shown here, the transmission 1 is embodied as a spur gear transmission configured as a bevel-and-spur gear train. However, it will be understood that the principles described in the following description with respect to the transmission 1 are equally applicable to any other type of transmission and the specific type of transmission is of no significance for the present invention.

The transmission 1 has a housing 2, which is divided into a housing top part 2a and a housing bottom part 2b. In the present case, the housing top part 2a and the housing bottom part 2b are of symmetrical construction and can be cast in a same die, although this is not obligatory. The transmission 1 furthermore includes an input shaft 3, via which the driving power enters the transmission 1, and an output shaft 4, which can be connected to a system (not illustrated), e.g. a conveyor belt system. Cooling structures in the form of a plurality of cooling elements 5 are arranged on the outside of the housing 2, with each cooling element 5 being made from open-cell metal foam and secured as a separate component on the housing 2. In the present case, each of the cooling elements 5 has a plate-shaped configuration and is manufactured from aluminum.

Provided between each of the cooling elements 5 and the housing 2 is an intermediate layer 6 which contains silicone and thermally conductive particles and is generally referred to as a "gap filler". By way of example, the cooling elements 5 are secured here on the housing 2 using screws 7. As an alternative or in addition, however, the cooling elements 5 can also be secured by adhesive bonding and/or using magnets. In the latter case, the cooling elements 5, of course, must be provided with corresponding magnets, which are not illustrated here.

To produce the housing illustrated hi MG. 1, the transmission 1 is assembled hi known manner in a first step. In a further step, the separate cooling elements 5 are then positioned and secured on an outer surface of the housing 2. Here, the number and position of the individual cooling elements 5 can be chosen according to a desired cooling capacity. In order to ensure good thermal coupling of the cooling elements 5 to the housing 2, despite the presence of uneven outer surface of the housing 2 produced by casting, an intermediate layer 6 which compensates irregularities in the outer surface of the housing 2 is positioned between each of the cooling elements 5 and the housing 2.

A significant advantage of a transmission 1 according to the present invention over a conventional transmission of same construction but provided with cooling fins is that the transmission 1 according to the present invention has a lower dead weight as a result of the use of cooling structures in the form of one or more cooling elements 5. Moreover, the production of the housing 2 or of the housing top and bottom parts 2a, 2b by casting is significantly cheaper due to the absence of cooling fins. Another advantage relates to the cooling capacity of the transmission 1, which cooling capacity is realized by the presence of cooling elements 5 and can be adjusted in a manner which is flexible and best suited to the demand at hand through suitable choice of shape, number and position of the cooling elements 5. Thus, it is also possible to provide transmissions of same construction with different cooling capacities using housings 2 of the same construction, so that series manufacture becomes much easier.

Although the invention has been illustrated and described more specifically in detail by means of a preferred illustrative embodiment, the invention is not restricted by the examples disclosed, and other variations can be derived by a person skilled in the art without departing in any way from the spirit and scope of the present invention. Thus, the cooling elements 5 can have a configuration that differs from a plate shape. It is also possible for the underside of the cooling elements 5 to be matched to a shape of the housing outer surface. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A transmission, comprising a housing made from a metallic material and including a cooling structure, said cooling structure including a plurality of cooling elements made from open-cell metal foam and individually and separately secured on an outer surface of the housing, and an intermediate layer containing silicone and thermally conductive particles provided between each of the plurality of cooling elements and the housing, wherein each of the plurality of cooling elements has an underside shape that matches a shape of a region of the outer surface of the housing to which each of the plurality of cooling elements is individually and separately secured, and a desired cooling capacity of the transmission is adjusted based on a choice of number, shapes, and location of the plurality of cooling elements.

2. The transmission of claim 1, wherein the plurality of cooling elements are made of aluminum or copper.

3. The transmission of claim 1, wherein the plurality of cooling elements have a plate-shaped configuration.

4. The transmission of claim 1, wherein the plurality of cooling elements are secured on the housing by a screw connection and/or adhesive bonding.

5. The transmission of claim 1, wherein the plurality of cooling elements are secured on the housing by a magnet.

6. A method for producing a transmission, said method comprising individually and separately securing on an outer surface of a housing made from a metallic material a plurality of cooling elements each having an underside shape that matches a shape of a region of the outer surface of the housing to which each of the plurality of cooling elements is individually and separately secured and made from open-cell metal foam to provide a cooling structure on the housing, providing an intermediate layer containing silicone and thermally conductive particles between each of the plurality of cooling elements and the housing, and adjusting a desired cooling capacity of the transmission based on a choice of number, shapes, and positions of the plurality of cooling elements.

7. The method of claim 6, wherein the plurality of cooling elements are secured on the housing by a screw connection and/or adhesive bonding and/or magnetically.

8. The transmission of claim 1, wherein the housing is produced by casting and the outer surface of the housing is uneven and the intermediate layer compensates for irregularities in the outer surface.

9. The transmission of claim 1, wherein each of the plurality of cooling elements is spaced apart on the outer surface of the housing.

10. The transmission of claim 1, wherein the underside shape of each of the plurality of cooling elements is in the form of a circular ring segment that matches a circular ring segment shape of the region of the outer surface of the housing to which each of the plurality of cooling elements is individually secured.

11. The method of claim 6, wherein the housing is produced by casting and the outer surface of the housing is uneven and the intermediate layer compensates for irregularities in the outer surface.

12. The method of claim 6, wherein each of the plurality of cooling elements is spaced apart on the outer surface of the housing.

13. The method of claim 6, wherein the underside shape of each of the plurality of cooling elements is in the form of a circular ring segment that matches a circular ring segment shape of the region of the outer surface of the housing to which each of the plurality of cooling elements is individually secured.

* * * * *